United States Patent
Heo et al.

(10) Patent No.: US 8,752,116 B2
(45) Date of Patent: Jun. 10, 2014

(54) METHOD FOR PARTLY UPDATING SOFTWARE IN NETWORK TELEVISION

(75) Inventors: Sohee Heo, Pyeongtaek-si (KR); Daesuk Park, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 332 days.

(21) Appl. No.: 12/875,722

(22) Filed: Sep. 3, 2010

(65) Prior Publication Data

US 2011/0061082 A1    Mar. 10, 2011

(30) Foreign Application Priority Data

Sep. 4, 2009    (KR) .......................... 10-2009-0083470

(51) Int. Cl.
| | |
|---|---|
| *H04N 7/173* | (2011.01) |
| *G06F 3/048* | (2013.01) |
| *G06F 9/44* | (2006.01) |
| *G06F 3/12* | (2006.01) |
| *G06F 9/445* | (2006.01) |

(52) U.S. Cl.
CPC *G06F 3/123* (2013.01); *G06F 8/65* (2013.01); *G06F 8/70* (2013.01)

USPC .......... 725/132; 715/764; 715/771; 715/772; 717/168

(58) Field of Classification Search
CPC .............. G06F 3/123; G06F 8/65; G06F 8/70
See application file for complete search history.

(56) References Cited

U.S. PATENT DOCUMENTS

| | | | | |
|---|---|---|---|---|
| 5,666,293 | A  * | 9/1997 | Metz et al. ................. | 709/220 |
| 2003/0195974 | A1* | 10/2003 | Ronning et al. ............ | 709/230 |
| 2007/0027971 | A1* | 2/2007 | Marolia et al. .............. | 709/223 |
| 2009/0249206 | A1* | 10/2009 | Stahlberg .................... | 715/716 |

* cited by examiner

*Primary Examiner* — Nathan Flynn
*Assistant Examiner* — James R Marandi
(74) *Attorney, Agent, or Firm* — KED & Associates LLP (57) ABSTRACT

A method of updating dedicated firmwares of a plurality of content providers in a network TV system is provided. A user interface allows easy and intuitive control of the update so that the firmwares according to the content providers can be updated in accordance with a user's desired order and type on the network.

15 Claims, 10 Drawing Sheets

METHOD FOR PARTLY UPDATING SOFTWARE IN NETWORK TELEVISION

CROSS-REFERENCE TO RELATED APPLICATIONS

The present application claims the benefit of priority under 35 U.S.C. 119 and 35 U.S.C. 365 to Korean Patent Application No. 10-2009-0083470 filed on Sep. 4, 2009, which is hereby incorporated by reference in its entirety.

BACKGROUND

The present disclosure relates to a network TV system, and more particularly, to a method for updating dedicated firmwares according to a plurality of content providers in a network TV system and to a user interface allowing easy and intuitive control of update operations so that the firmwares according to the content providers can be updated in accordance with a user's desired order and type on the network.

With the development and commercialization of digital TV technology from the conventional analog broadcast, the internet as well as other conventional transmission media connected to each home can be used to provide various content services such as real-time broadcasts, contents on demand (COD), games and news to users.

An internet protocol TV (IPTV) is an example of the content service based on the internet. The IPTV transmits various information services, video contents and broadcasts through the ultrahigh-speed internet to provide the same to users' TVs.

Recently, a broadband TV and a web TV have been introduced as a kind of network TV evolved from the IPTV. Unlike the IPTV, the broadband TV or the web TV is provided with a plurality of content providers so that users can separately connect to the content providers to receive various video on demand (VOD), games and video phone services provided by the content providers.

On such a network TV system, the content providers provide not only the contents but also firmwares for embodying their own contents. The firmwares need to be continuously updated.

With increase in kinds of contents in the network TV system, an amount of software to be updated increases.

When a user updates the software in a batch, it may take a long time, for example, even tens of minutes. Furthermore, if some unwanted software is selected by mistake or if the user wants to stop midway due to lack of time, the user may feel uncomfortable since he/she cannot be aware of which firmware is being updated and how much the update has been progressed.

Although a desired firmware is selected and updated, a progress bar provided for the user only shows the progress percentage of the update and allows control of only starting and finishing of the update. Therefore, it is hard to control the progress of the update or stop the update midway. Moreover, when the update is stopped midway, update of contents already normally updated is cancelled. Therefore, the update should be performed from the first later, which causes loss of time.

Thus, the user may not want to update not frequently used contents when updating the software, causing waste of time. To this end, a technology is required which allows the user to update only desired contents first and, at any time, select the number of contents to update and stop the update. Also, it is required to achieve those operations through a simple remote controller operation and show the operations on a screen for the user's understanding.

SUMMARY

Embodiments provide a method of updating firmware on a network TV, including receiving firmware update information from a network operator; displaying the firmware update information; selecting firmware to update by a user; and performing the update of the selected firmware.

Embodiments also provide a display device accessible to a network, including a network interface unit connected with at least one server of a content provider through the network to receive contents and also receive firmware update information and an firmware update file of the display device from the network operator; a displaying unit adapted to display the firmware update information; a user interface unit adapted to receive a user's input selecting one of the displayed update information; and a controlling unit adapted to receive the firmware update file corresponding to the selected update information and perform update of firmware based on the received firmware update file.

According to the embodiments, a user is able to select an object and an order of update when updating contents or firmwares provided by content providers.

In addition, while contents or firmwares are being updated on the network TV system, the update may be stopped or changed in the order.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings. Wherever possible, the same reference numbers will be used throughout the drawings to refer to the same or like parts.

The embodiment will be described in detail with reference to the drawings.

Figure 1:
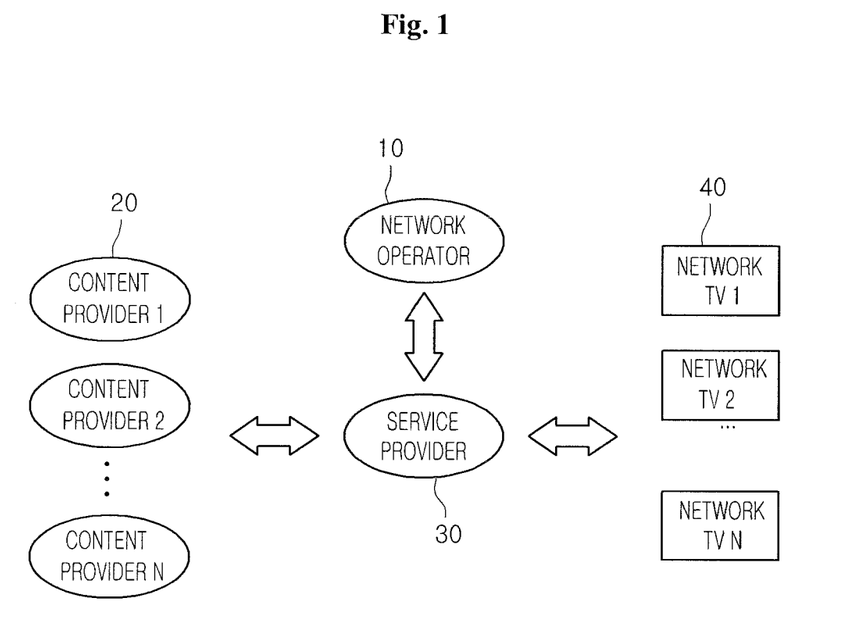
FIG. 1 is a view showing a network structure of a network TV system according to one embodiment.

FIG. 1 shows a network TV structure of a network TV system according to one embodiment.

Referring to FIG. 1, the network TV system is constituted by a network operator 10, at least one content provider 20, a service provider 30, and at least one network TV 40.

The network operator 10 supplies base software necessary to normally operate contents provided by the content provider 20 on the network TV 40. Also, the network operator 10 may supply the content provider 20 with information on hardware of the network TV 40, which is necessary to normally operate the contents on the network TV 40.

For example, the network operator 10 may supply a main screen formed when the contents provided by the content providers 20 are displayed on the network TV 40, and a user interface enabling a user to select the contents. In addition, whenever necessitated by the user interface, the network operator 10 may supply information for update of firmware or software of the network TV 40. The network operator 10 may be a server operated by a manufacturer of the network TV 40.

According to the embodiment, the network operator 10 stores firmware update files received from the content providers 20 and, when the update of the respective network TVs 40 is performed, transmits necessary update information to the network TVs 40. Here, update files selected by the user is transmitted to the network TV 40.

The content provider 20 generates contents into a format reproducible on the network TV 40 and supplies the contents on request by the network TV 40. The contents may be any data that can be served through the network.

The network TV 40 may be equipped with dedicated firmware to reproduce contents, search the contents, display a list of the contents, and so forth according to the content providers 20. The firmware may be installed in the network TV 40 during manufacturing of the network TV 40 or downloaded by the user through the network during use of the network TV 40.

The firmware of the network TV 40 refers to a program to reproduce or perform the contents provided by the content providers 20. The firmware may be various according to kinds of the contents provided by the content providers 20. For example, if the content provider 20 is a VOD operator, the firmware may be a VOD reproducing program. If the content provider 20 is an audio on demand (AOD) or music on demand (MOD) operator, the firmware may be an AOD or MOD reproducing program. Additionally, if the content provider 20 is a video phone operator, the firmware may be a video phone program.

The firmware dedicated for the content provider 20 may be upgraded or updated when necessary, as will be described below. Here, the update file of the firmware may be supplied by the network operator 10 or by the respective content providers 20. In the case where the network operator 10 provides the update file, the update file may be received by the content providers 20 and collectively transmitted to the network TV.

The service provider 30 provides a network communication among the network operator 10, the content provider 20, and the network TV 40. The network may include any wired or wireless internet network using an internet protocol. Especially, the service provider 30 transmits the contents provided by the content provider 20 to the network TV 40 and maintains and manages a transmission network for a user to stably receive the contents. Also, the service provider 30 supplies the content provider 20 with basic facility for the network transmission.

In response to the user's command, the network TV 40 receives the contents through the service provider 30 and reproduces or performs the contents. According to a certain embodiment, the network TV 40 may be replaced with a device equipped with a network module, such as a network set-top box, and a network phone.

More specifically, the content provider 20 may be an operator manufacturing various contents to be provided to the network TV 40. For example, the content provider 20 may include a TV broadcasting station, a radio broadcasting station, a VOD operator, an AOD operator, a game operator, a video phone service provider, and so forth.

Here, the TV broadcasting station means an existing terrestrial broadcasting station or a cable broadcasting station. Such broadcasting stations may produce and store programs to be watched by users and digitalize the programs for transmission.

The radio broadcasting station supplies audio contents and is operated usually without a video channel but sometimes with the video channel.

The VOD operator and the AOD operator are different from the TV broadcasting station and the radio broadcasting station. The difference is in that the VOD and the AOD operators enable the user to store and reproduce broadcast programs, movies, or music as desired. For example, if the user has missed to watch a certain broadcast program on time, the user is able to download or immediately reproduce a file corresponding to the missed program by accessing a site offering the broadcasting service.

In the similar manner, the AOD operator enables the user to listen to an audio program in real time.

The MOD service enables the user to download and reproduce desired music. The MOD service seems similar to the AOD service. However, generally, the MOD service targets on music record companies or may be implemented by expanding existing web services by record distributors.

Besides the above, the content provider 20 may be any type of server operator that supplies various services to the network TV through the internee, such as a packet filter (PF) server, an electronic program guide (EPG) service provider, an electronic content guide (ECG) service provider, and a portal server operator.

The PF server may be serviced by a company that manages all broadcast information and location information provided by the content provider. The service mainly contains broadcast time information or location information necessary for the broadcast of a corresponding broadcasting station and also contains information accessible by the user.

The EPG service provides EPG information so that the user may refer to broadcast programs according to time zones and channels.

In addition, the ECG service provides the user with information on the contents of the content provider, a location of an accessed server, and access rights. In other words, the EPT service refers to an electronic program guide which enables easy access to the server having the contents and providing detailed information on the contents.

The portal server is a web service provided by respective broadcasting stations. Upon receiving a request from a user terminal, the portal server is connected to a web server of a broadcasting station or company that provides contents. Through the portal server, the user is able to inquire a program list provided by the broadcasting stations or the content providers that provide contents services.

The service provider 30 transmits data and commands of the network operator 10, the content provider 20, and the network TV 40. The service provider 30 may be an internet service provider. According to a certain embodiment, when the service providers 30 provides the internet service through a general cable network, equipments of the transmission network need to be changed.

To be more specific, the service provider 30 may construct network equipments capable of real time data transmission. The network may be constructed at the network TV 40 in consideration of a bandwidth. Those equipments process high capacity multimedia data using a multicast service, one of basic network services of the network TV 40, thereby reducing the bandwidth.

When the bandwidth is not sufficiently secured, the service provider 30 secures the bandwidth by transcoding again broadcast data transmitted from an optical cable network or the content provider 20, thereby converting the data into the format such as motion picture expert group (MPEG)-4 or MPEG-7 for transmission.

Figure 2:
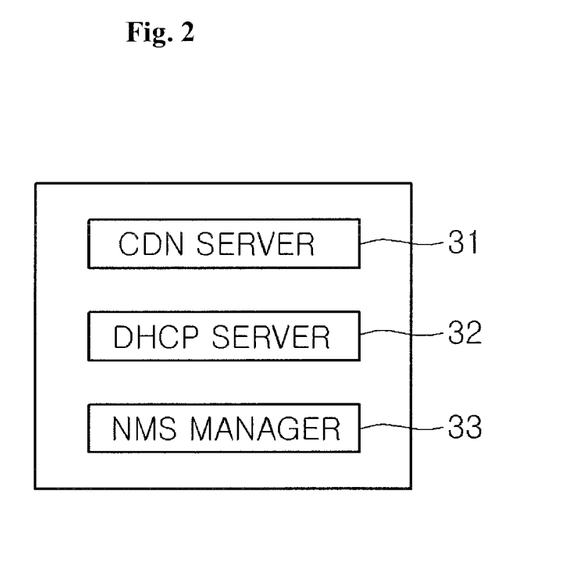
FIG. 2 is a view showing the structure of a service provider, according to the embodiment.

For this, the service provider 30 may provide services including a network management system (NMS), a dynamic host control protocol (DHCP), and a contents delivery network (CDN). As shown in FIG. 2, the service provider 30 may include servers to provide the above services.

Referring to FIG. 2, an NMS manager 33 has the service provider 30 manage the network TV 40 and the transmission network to transmit data to the respective network TVs 40. In other words, the NMS manager 33 checks how much traffic is occurring and which region has insufficient bandwidth with respect to the contents being transmitted through the network.

A DHCP server 32 automatically allocates an internet protocol (IP) address to the network TV 40 and informs the network TV 40 of a CDN server address. The DHCP server 32 allocates IP addresses to the respective personal computers (PC) even on the network using general PCs. The DHCP server 32 informs the network TV 40 allowed to be used of an accessible address so that the user performs a registration procedure when first accessing the address.

The CDN server 31 provides CDN information that the service provider 30 provides to the network TV 40. When first operated by application of power supply, the network TV 40 receives the IP address from the DHCP server 32 and, simultaneously, receives CDN information from the CDN server 31. The information may include information on user registration or authentication of the content provider 20 and the PF information described above.

The network TV 40, as described above, may be replaced with a network set-top box or a network phone equipped with an internet communication module. The network TV 40 may be structured as will be described with reference to FIG. 3.

Figure 3:
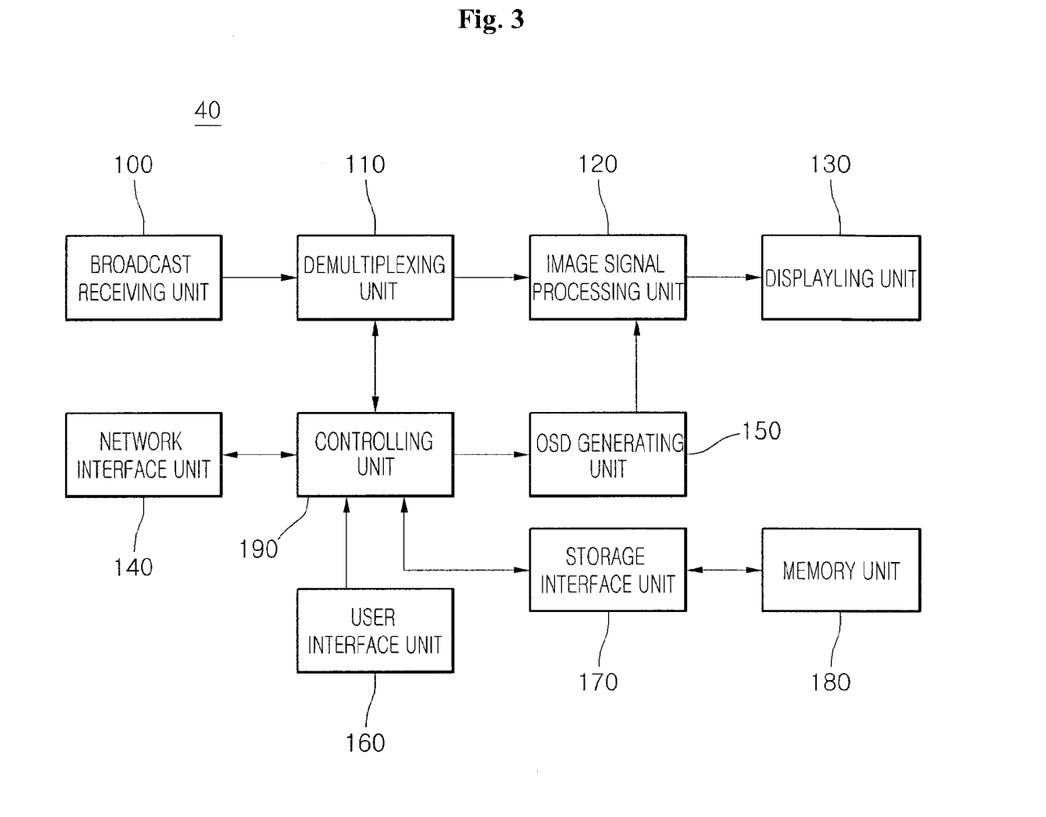
FIG. 3 is a block diagram showing the structure of the network TV according to the embodiment.

The network TV 40 basically includes a network interface accessible to the network. Also, the network TV 40 processes data packets received from the network, by being allocated with an IP address or by an already allocated IP address. When the data packets are in the form of multimedia data, the network TV 40 may reproduce the data packets on a screen.

The network TV 40 may operate interactively, that is, transmit the user's demands while processing the multimedia data. In addition, exemplarily, a remote controller for controlling the network TV 40 may be provided with buttons for operation of the network TV 40.

Hereinafter, the structure and the operation of the network TV 40 will be described in detail. FIG. 3 is a block diagram showing the structure of the network TV according to the embodiment.

The network TV 40 may receive contents through the network or wirelessly receive broadcast signals in the form of radio frequency (RF) signal through a broadcast receiving unit 100. The contents received through the network may include broadcast signals.

The network TV 40 includes the broadcast receiving unit 100, a demultiplexing unit 110, an image signal processing unit 120, a displaying unit 130, a network interface unit 140, an on screen display (OSD) generating unit 150, a user interface unit 160, a storage interface unit 170, a memory unit 180, and a controlling unit 190.

When the contents are digital broadcast, signals of the digital broadcast are transmitted in the form of a transport stream generated by time-division multiplexing and packeting video signals, audio signals, and additional data.

The broadcast receiving unit 100 receives broadcast signals transmitted from the outside via an antenna. For this, the broadcast receiving unit 100 may include a tuner adapted to tune broadcast signals in accordance with tuning control signals, the broadcast signals having frequency bandwidths corresponding to the tuning control signals. The broadcast receiving unit 100 may also include a demodulator adapted to output the tuned broadcast signals of a certain channel in the form of the transport stream through a vestigial sideband (VSB) procedure and an error correction procedure.

The broadcast signals received through the broadcast receiving unit 100 are divided by the demultiplexing unit 110 into video signals, audio signals and various additional data defined as program and system information protocol (PSIP) information and so on and thereby output in the form of a bit stream.

Video data divided by the demultiplexing unit 110 is processed by the image signal processing unit 120 and displayed on the displaying unit 130.

Here, the image signal processing unit 120 may include an MPEG-2 decoder, and a scaler that converts the video data to suit vertical frequency, resolution, and a screen size in accordance with the output standard of the displaying unit 130.

Here, the displaying unit 130 may be various display devices including a digital light processing (DLP), a liquid crystal display (LCD), a plasma display panel (PDP), and the like.

The audio signals are processed by an audio signal processing unit (not shown) and output through a speaker. The audio signal processing unit may include an AC-3 decoder.

The additional data included in the additional data divided by the demultiplexing unit 110 is stored in the memory unit 180 through the storage interface unit 170 that will be described later.

The memory unit 180 may be an electrically erasable programmable read-only memory (EEPROM).

The user interface unit 160 is input with the user's command. In general, the user interface 160 may include an infrared (IR) receiving unit receiving IR signals input through the remote controller or a local key input unit provided at one side of a panel.

The network interface unit 140 receives contents or data from the network. Specifically, the network interface unit 140 receives contents provided by the content provider through the network, such as provide, games, VOD, broadcast signals, and so forth, and relevant information. Also, the update information and the update file of the firmware provided by the network operator 10 are received through the network interface 140.

The OSD generating unit 150 generates a menu screen in the form of an OSD for input of signals determined by the user.

That is, the OSD generating unit 150 may display the contents received through the network interface unit 140 and the relevant information through the displaying unit 130.

The controlling unit 190 controls the overall operations according to the commands input through the user interface 160.

The controlling unit 190 receives and performs the update file of the firmware which is software of the content provider 20 received from the network operator 10. According to the embodiment, as will be described later, an order of the firmware update and whether to perform the firmware update may be determined by the user.

Figure 4:
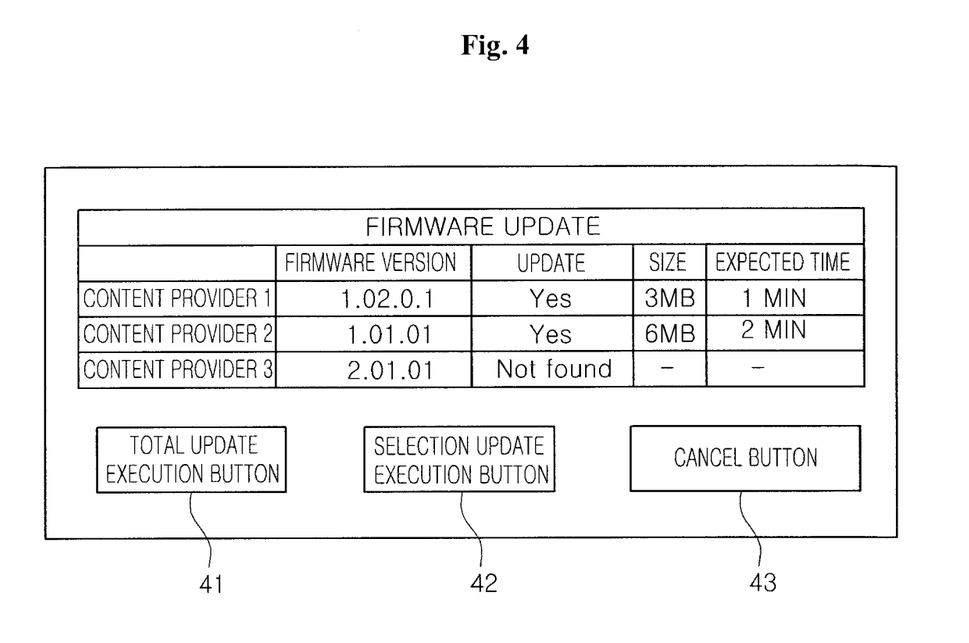
FIGS. 4 to 6 show a screen displayed when a firmware update menu of the network TV is performed by a user, according to the embodiment.

FIG. 4 shows a screen displayed when the user performs a firmware update menu of the network TV. According to a certain embodiment, the update menu may be automatically performed right before the network TV is finished or right after the network TV is turned on, without the user's operation.

When the firmware update is operated, the network TV 40 receives the update information from the network operator 10 and displays the update information according to the content providers as shown in FIG. 4. The update information may include a version of the firmware currently installed in the network TV 40, necessity of the update, size of the update file, and an expected download time of the update file.

A total update execution button, a selection update execution button, and a cancel button may be displayed on the screen. When the user selects the total update execution button, the firmware update of all the content providers being displayed may be downloaded and performed.

Figure 5:
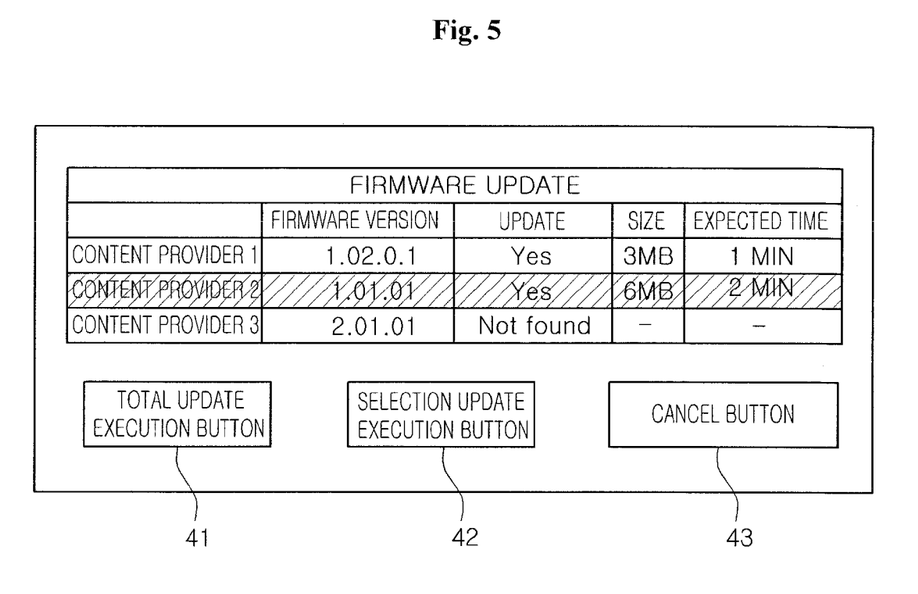

When the user selects items to update as shown in FIG. 5, the selected items may be marked by highlighting or in other manners. In this state, when the user selects the selection update execution button, the update regarding the selected content providers is performed. That is, the update file is downloaded.

The user may select the firmware to update considering the file size and the expected download time.

Figure 6:
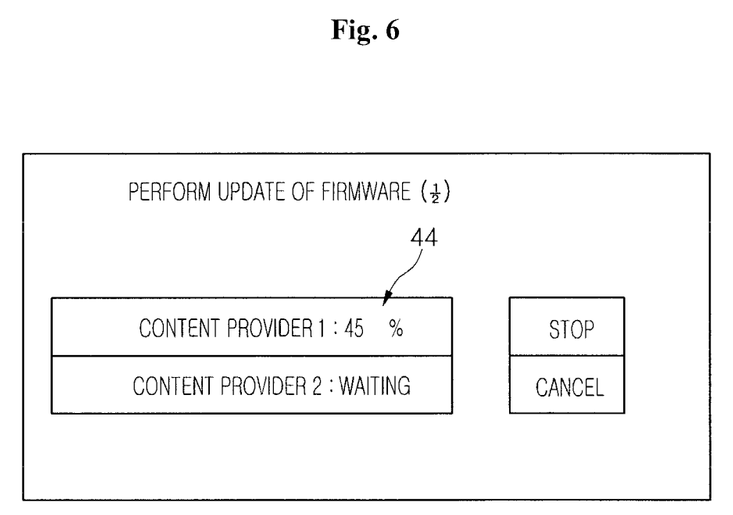

FIG. 6 shows an update progress screen displayed when the update is performed according to the embodiment.

If the user selects to update the firmware of a first content provider and a second content provider in consideration of the update information, the firmware update of the selected contents is performed in an order as shown in FIG. 6. The update progress screen may show a progress rate 44 of currently updated firmware, and a stop button to stop the update being performed. The cancel button may be displayed beside a file to be updated next. Therefore, the next file may not be updated according to the user's selection.

Figure 7:
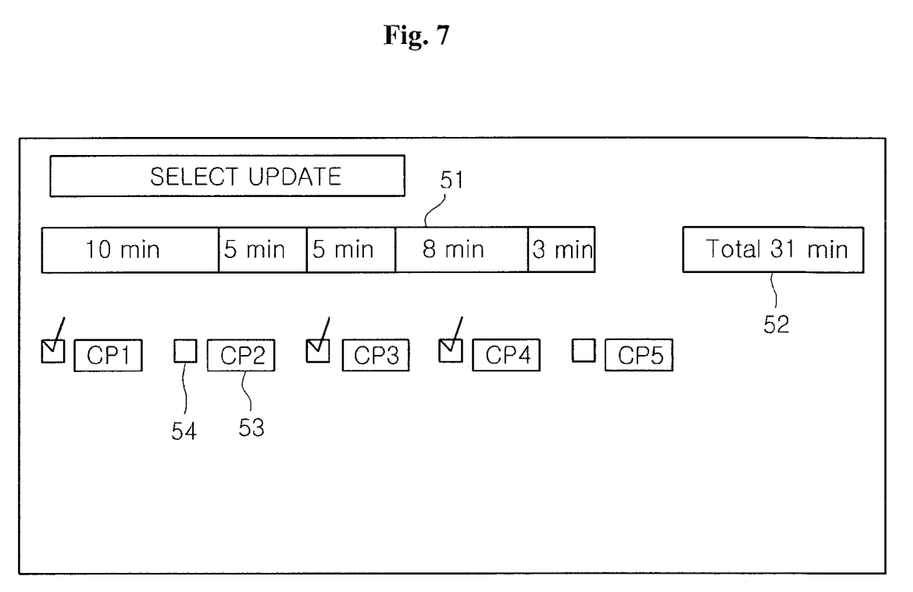
FIGS. 7 to 9 show a screen displayed when a firmware update menu of the network TV is performed by a user, according to another embodiment.
Figure 8:
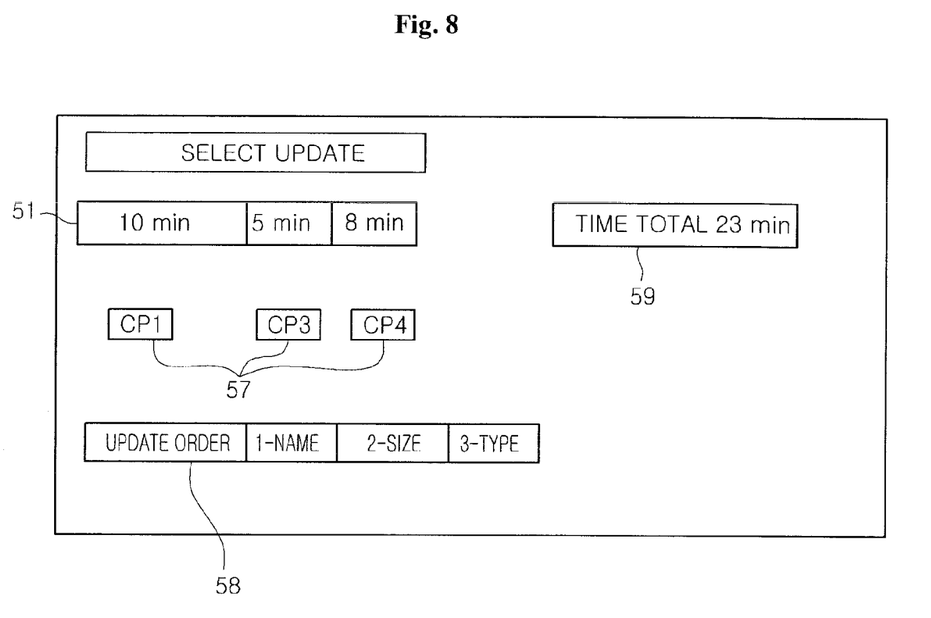
Figure 9:
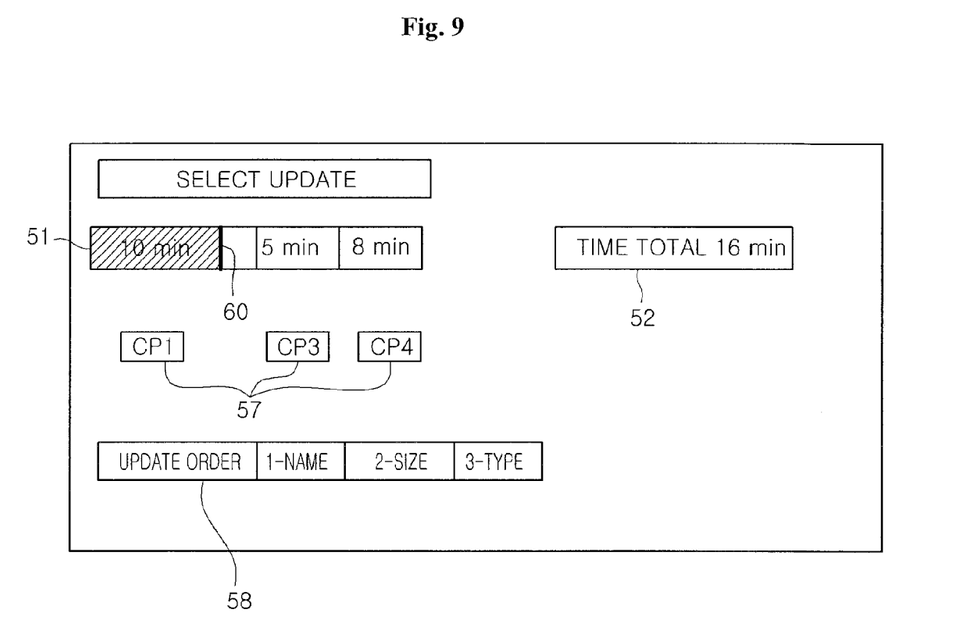

FIGS. 7 to 9 show a firmware update method according to another embodiment. The embodiment of FIGS. 7 to 9 introduces a user interface providing the user with the update information easier to visually understand and enabling the user to more conveniently select the file to update.

Upon selection of the firmware update menu by the user, the network TV receives the firmware update information from the network operator and displays the update information as shown in FIG. 7. The update information may include expected required time to receive the firmware update file per the content provider, illustrate by a graph. FIG. 7 shows bar graphs 51 proportional to the expected time. According to a certain embodiment, not only the bar graph but also any other method may be used as long as visually indicating the expected time or the size of the file to be downloaded.

In FIG. 7, the times required for the update are displayed by the bar graphs 51 according to the content providers, the content providers 53 are displayed at positions corresponding to the respective bar graphs 51, and check boxes 54 are displayed next to the respective content providers 53. Therefore, by marking the check boxes 54, the user may select a desired item to update among update items supplied by the content providers. In addition, a time total 52 may be displayed at one side of the screen.

After the user selects the firmware to update, the bar graphs 51 constituted by selected update items are displayed as shown in FIG. 8. Also, the content providers 57 corresponding to the selected items are displayed. A total required time 59 to perform the selected update is displayed at one side of the screen.

According to the embodiment, the user may set an update order. For this, an update order button 58 may be displayed at one side of the screen. The user selects the update order button 58 and then selects a menu number to determine an ordering basis for rearrangement of the update items. For example, when the user selects a menu number 1, the update items are arranged in order of name of the content providers. When the user selects a menu number 2, the update items are arranged in order of size of the contents to be updated. When a menu number 3 is selected, the update items are arranged in order of type of the content providers, for example, according to VOD content providers, AOD content providers, game content providers, and video phone content providers.

When it is commanded to perform the update after determination of the update order, a screen may be displayed as shown in FIG. 9. The update progress screen may show a progress bar 60 indicating completion progress of the update on the bar graph 51. For example, an update-completed portion on the bar graph 51 may be highlighted. A remaining time 59 may be displayed at one side of the screen.

According to the embodiment, the update order of the update items which are not yet updated can be changed even in the middle of the update. An update order change button 61 may be displayed at one side of the screen. When the user selects the button 61, the remaining update items may be rearranged in another order or a menu for changing the update order may be displayed.

Figure 10:
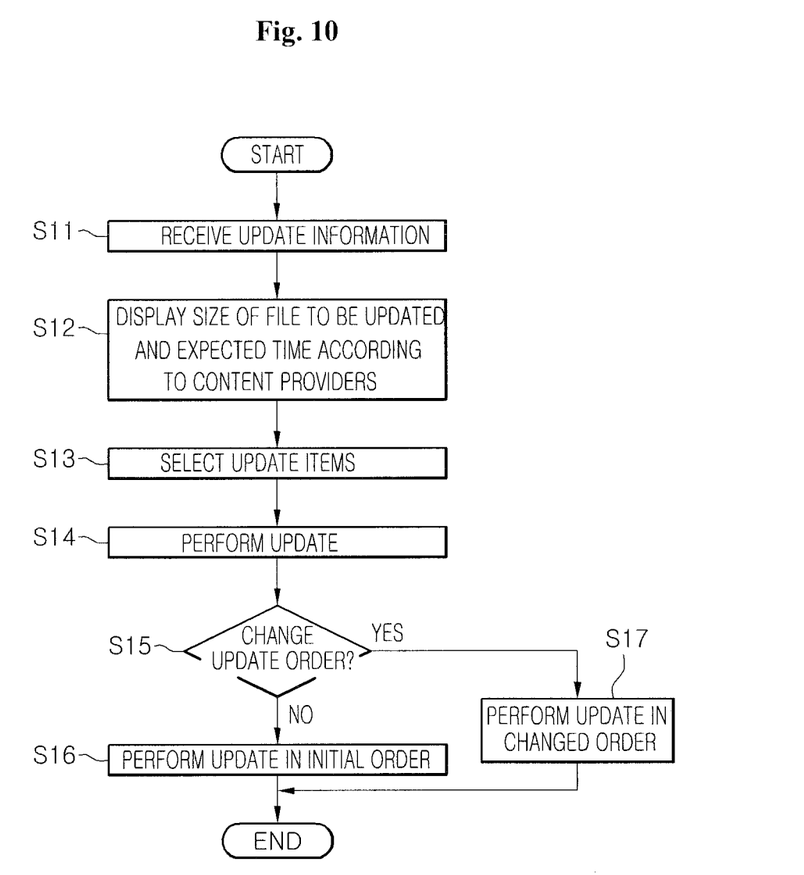
FIG. 10 is a flowchart showing a method of updating firmware of the content provider, according to the embodiment.

FIG. 10 is a flowchart showing a method of updating firmware of the content provider, according to the embodiment.

In operation S11, the update information is received from the network operator. In operation S12, the size of the file to be updated of the firmware and the expected time, that is, the size of the file to be downloaded and the expected required time are displayed per the content provider. In operation S13, the user selects the firmware to update based on the displayed update information. The selection may be performed through the interface as shown in FIGS. 4 and 5 or the interface as shown in FIG. 7. In operation S14, when the user inputs a command to perform the update, the update is started with respect to the selected update items. According to a certain embodiment, the user may set the update order before the update is started.

In operation S15, if an update order change command is not input during the update, the files are downloaded according to the update order set before starting of the update. If the update order change command is input, the update is performed in the changed order in operation S17.

Although the embodiments have been described about update of firmware provided by content providers, the embodiments are applicable to all files needing to update on the network TV.

In addition, although the firmware update file of the content providers is received from the network operator according to the embodiments, the update file may be received directly from the respective content providers.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of updating firmware on a network television (TV), comprising:
   receiving firmware update information according to content providers from a network operator, wherein the firmware update information includes information on updates of a plurality of dedicated firmware items that respectively correspond to the content providers;
   displaying, on the network TV, the firmware update information according to the content providers;
   receiving a user input for selecting a plurality of update target firmware items to update from among the plurality of dedicated firmware items;
   performing the update of the selected update target firmware items; and
   displaying an update progress screen during the update of the selected update target firmware items,
   wherein the update progress screen includes:
      a plurality of progress rates that respectively represent how much the selected update target firmware items are updated, and
      a plurality of graphic user interface (GUI) elements that respectively correspond to the selected update target firmware items,
      wherein a stop function for stopping an update of a first selected update target firmware item that is being updated is provided to a GUI element corresponding to the first selected update target firmware item,
      wherein a cancel function for canceling an update of a second selected update target firmware item that is not yet updated is provided to a GUI element corresponding to the second selected update target firmware item.

2. The method according to claim 1, wherein the firmware update information comprises a size of an update file and an expected required time according to content providers, wherein the times required for the updates of the firmwares are displayed by bar graphs according to the content providers, and the content providers are displayed at positions corresponding to the respective bar graphs.

3. The method according to claim 1, further comprising:
   receiving, from the user, an update order change command during the update of the selected update target firmware items; and
   changing an update order of the selected update target firmware items.

4. The method according to claim 1, further comprising:
   displaying a progress bar indicating progress of the update and highlighting an update-completed portion on the displayed progress bar during the update of the selected update target firmware items.

5. The method according to claim 1, further comprising:
   displaying a remaining update time during the update of the selected update target firmware items.

6. The method according to claim 1, wherein the plurality of dedicated firmware items comprise one of a video on demand (VOD) reproducing program, an audio on demand (AOD) reproducing program, a music on demand (MOD) reproducing program, and a video phone program.

7. The method according to claim 1, wherein the network operator is a server of an operator that provides the network TV with basic software necessary for normal operation of the contents.

8. A display device accessible to a network, comprising:
   a network interface unit connected with at least one server of a content provider through the network to receive contents and also receive firmware update information and a firmware update file of the display device from a network operator, wherein the firmware update information includes information on updates of a plurality of dedicated firmware items that respectively correspond to the content providers;
   a displaying unit adapted to display the firmware update information according to the content providers;
   a user interface unit adapted to receive a user's input to select a plurality of update target firmware items to update from among the plurality of dedicated firmware items; and
   a controlling unit adapted to perform the update of the selected update target firmware items and to display, on the displaying unit, an update progress screen during the update of the selected update target firmware items,
   wherein the update progress screen includes:
      a plurality of progress rates that respectively represent how much the selected update target firmware items are updated, and
      a plurality of graphic user interface (GUI) elements that respectively correspond to the selected update target firmware items,
      wherein a stop function for stopping an update of a first selected update target firmware item that is being updated is provided to a GUI element corresponding to the first selected update target firmware item,
      wherein a cancel function for canceling an update of a second selected update target firmware item that is not yet updated is provided to a GUI element corresponding to the second selected update target firmware item.

9. The display device according to claim 8, wherein the firmware update info nation comprises a size of an update file and an expected required time according to content providers, wherein the times required for the updates are displayed by bar graphs according to the content providers, and the content providers are displayed at positions corresponding to the respective bar graphs.

10. The display device according to claim 8, wherein the controlling unit changes an update order of the selected update target firmware items to be updated and performs the update when the update order change command with respect to the selected update target firmware items to be updated is received from a user during the update.

11. The display device according to claim 8, wherein the displaying unit displays a progress bar and highlights an update-completed portion on the progress bar during the update to indicate progress of the update.

12. The display device according to claim 8, wherein the displaying unit displays a remaining update time during the update of the selected update target firmware items.

13. The display device according to claim 8, wherein the plurality of dedicated firmware items comprise one of a video on demand (VOD) reproducing program, an audio on demand (AOD) reproducing program, a music on demand (MOD) reproducing program, and a video phone program.

14. The display device according to claim 8, wherein the network operator is a server of an operator that provides the display device with basic software necessary for normal operation of the contents.

15. The display device according to claim 8, wherein the displaying unit displays update condition information during the update of firmware.

* * * * *